United States Patent
Agasaveeran et al.

(10) Patent No.: US 7,484,011 B1
(45) Date of Patent: Jan. 27, 2009

(54) APPARATUS AND METHOD FOR RATE LIMITING AND FILTERING OF HTTP(S) SERVER CONNECTIONS IN EMBEDDED SYSTEMS

(75) Inventors: Saravanan Agasaveeran, Newark, CA (US); Anantha Ramaiah, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 605 days.

(21) Appl. No.: 10/681,870

(22) Filed: Oct. 8, 2003

(51) Int. Cl.
*G06F 15/16* (2006.01)

(52) U.S. Cl. .................................................. 709/250

(58) Field of Classification Search ......... 709/232–235, 709/250; 726/13; 713/153–154
See application file for complete search history.

(56) References Cited

U.S. PATENT DOCUMENTS

| | | | | |
|---|---|---|---|---|
| 6,128,653 A * | 10/2000 | del Val et al. | | 709/219 |
| 6,273,622 B1 * | 8/2001 | Ben-David | | 709/230 |
| 6,374,305 B1 * | 4/2002 | Gupta et al. | | 709/246 |
| 6,510,461 B1 * | 1/2003 | Nielsen | | 709/224 |
| 6,643,655 B2 * | 11/2003 | Oashi et al. | | 707/10 |
| 6,650,640 B1 * | 11/2003 | Muller et al. | | 370/392 |
| 6,826,620 B1 * | 11/2004 | Mawhinney et al. | | 709/235 |
| 6,882,624 B1 * | 4/2005 | Ma | | 370/236.1 |
| 6,996,117 B2 * | 2/2006 | Lee et al. | | 370/429 |
| 7,047,312 B1 * | 5/2006 | Aweya et al. | | 709/235 |
| 7,062,540 B2 * | 6/2006 | Reddy et al. | | 709/217 |
| 7,117,267 B2 * | 10/2006 | Bavadekar | | 709/230 |
| 7,131,037 B1 * | 10/2006 | LeFaive et al. | | 714/46 |
| 2002/0059517 A1 * | 5/2002 | Haviv et al. | | 713/154 |
| 2002/0087709 A1 * | 7/2002 | Kerr et al. | | 709/231 |
| 2002/0124103 A1 * | 9/2002 | Maruyama et al. | | 709/234 |
| 2002/0133606 A1 * | 9/2002 | Mitomo et al. | | 709/229 |
| 2003/0172145 A1 * | 9/2003 | Nguyen | | 709/223 |
| 2003/0212821 A1 * | 11/2003 | Gillies et al. | | 709/238 |
| 2003/0229702 A1 * | 12/2003 | Hensbergen et al. | | 709/228 |
| 2004/0250127 A1 * | 12/2004 | Scoredos et al. | | 713/201 |
| 2006/0242313 A1 * | 10/2006 | Le et al. | | 709/230 |
| 2006/0256788 A1 * | 11/2006 | Donahue | | 370/389 |

* cited by examiner

*Primary Examiner*—Kenny S Lin
*Assistant Examiner*—Tauqir Hussain
(74) *Attorney, Agent, or Firm*—Brinks Hofer Gilson & Lione (57) ABSTRACT

A system for filtering transport layer connections with application layer connection outcomes provides a connection database to store information about connection requests and associated application layer outcomes. The system further includes a throttle filter populated with data from the connection database. The throttle filter is a list of connection requestor identifier, such as IP addresses or port numbers, to be used to identify connection requests to be blocked based on previous connection requests from the connection requesters. The system provides attack and overload protection and load balancing in embedded systems.

26 Claims, 6 Drawing Sheets

FIGURE 1

| CONNECTION DATABASE | | | | |
|---|---|---|---|---|
| REQUESTOR IDENTIFIER | | REQUESTOR CONNECTION RATE | RANK | ENTRY AGE |
| IP ADDRESS | PORT NO. (OPTIONAL) | | | |
| | | | | |
| | | | | |
| | | | | |
| | | | | |
| | | | | |

APPARATUS AND METHOD FOR RATE LIMITING AND FILTERING OF HTTP(S) SERVER CONNECTIONS IN EMBEDDED SYSTEMS

BACKGROUND OF THE INVENTION

Communications between clients and servers in a large network such as the Internet involve a number of steps and protocols. Establishing, maintaining and closing connections between servers require expenditure of network resources. Particularly where several steps are involved, there is likelihood for resources to be inefficiently used. For example, server resources may be reserved for a communication that is ultimately not successful. The reserved resources may not be returned or may be returned after some delay. Repeated occurrences of this can result in a server overload condition.

The problem outlined above can occur, for example, in an Internet communication using the Transmission Control Protocol (TCP) and the Hyptertext Transfer Protocol (HTTP) to make a connection between servers. TCP enables two servers in a network to establish a connection and exchange streams of data by sending data in the form of message units (also referred to as "packets") and by guaranteeing that the message units are delivered in the same order in which the message units were sent. TCP is referred to as a connection-oriented protocol because a TCP connection is generally established and maintained until the message or messages to be exchanged by the application programs in servers at each end of a connection have been exchanged. HTTP is a protocol used by the World Wide Web (WWW). HTTP defines how messages are formatted and transmitted and includes commands for operating Web servers and browsers. HTTP is referred to as a stateless protocol because each command is executed independently, without knowledge of the commands that came before it. HTTP is also referred to as layered on top of TCP because an HTTP connection is established after the completion of a TCP connection in establishing a connection between servers.

The Open Systems Interconnection (OSI) network model, adopted by the International Organization of Standards (ISO), provides a common reference point for network development. The OSI provides a description for how messages are transmitted between any two points in a network.

Under the OSI model, the process of communication between two end points in a network is divided into seven layers, with each layer adding its own set of functions. Each communicating user or program is at a computer equipped with these seven layers of functions. Accordingly, in a message between users, there is a flow of data through each layer at one end down through the layers in that computer and, at the other end, when the message arrives, another flow of data up through the layers in the receiving computer and ultimately to the end user or program.

The seven layers include two groups. The upper four layers form a first group and are used whenever a message passes from or to a user. The lower three layers form a second group and are used when a message passes through a host computer. Messages intended for the host computer then pass to the upper layers. Messages destined for a second host are not passed up to the upper layers but are forwarded to another host. The seven layers are the physical layer, the data-link layer, the network layer, the transport layer, the session layer, the presentation layer, and the application layer. The physical layer, also referred to as "layer 1", conveys a bit stream of the transmitted data through the network at the hardware level. The data-link layer, also referred to as "layer 2", provides synchronization for the physical level and includes transmission protocol knowledge and management. The network layer, also referred to as "layer 3", handles routing of data through the network. The transport layer, also referred to as "layer 4", manages the end-to-end control of data transmission through the network and error-checking. The session layer, also referred to as "layer 5", sets up, coordinates, and terminates communication between applications between points in the network. The presentation layer, also referred to as "layer 6", is typically a part of an operating system, converts incoming and outgoing data from one presentation format to another. The application layer, also referred to as "layer 7", identifies communication partners in a network communication and quality of service for the network communication, performs user authentication and identifies constraints on data syntax among other operations to enable applications to run. Under the OSI model, TCP is a transport layer protocol and HTTP is an application layer protocol.

SUMMARY OF THE INVENTION

Conventional network technology does not provide a dynamic system using connection outcome information to minimize the accumulation of connection overhead. The accumulation of connection overhead from ultimately unsuccessful connection requests results in inefficient operation of computer systems, particularly embedded systems. The problem leaves these systems vulnerable to attack by hackers because an attacker needs only to send repeated requests in a short period of time to negatively affect system performance.

HTTP connections carry significant system overhead. Each HTTP request that arrives on a non-persistent HTTP connection includes TCP overhead for TCP connection creation and close even where the HTTP request is unsuccessful. An HTTP server may reject an HTTP connection with or without an error response after the associated TCP connection is established. The reasons for rejection are various and include incorrect headers, timeout, and so on. Persistent HTTP connections attempt to amortize this overhead over several requests. Persistent HTTP connections, however, provide no guarantee of success in amortization since either the server or the client may close the connection before several requests are processed.

HTTP over Secure Sockets Layer (HTTPS) protocol is also subject to the accumulation of TCP connection overhead because Secure Sockets Layer (SSL) is layered between TCP and HTTP. That is, the SSL connection is established after the TCP connection is established. SSL is a protocol for managing the security of a message transmission on the Internet. SSL uses a public-and-private key encryption system that also includes the use of a digital certificate. Accordingly, SSL connection overhead is significant in network I/O as well as in controller resources due to multiple packet exchange and controller-intensive encryption operations.

Even after an HTTP server (or an HTTPS server) closes a connection, TCP may hold the TCP connection in the server in a close state (TIME_WAIT, FINWAIT2, or CLOSING) for several minutes thus prolonging the consumption of server resources. If connections are closed frequently enough, the embedded system may accumulate too many TCP connections in one of the above TCP close states thereby consuming a significant amount of memory. This can also eventually drive the server into TCP socket descriptor exhaustion. Delay in closing TCP connections can be a significant problem because certain systems, such as routers, typically have a limited amount of memory and controller resources.

HTTP servers deployed within embedded systems, such as routers, are subject to more severe resource constraints as the main purpose of the embedded system is to do routing or switching, and the HTTP server is expected to consume only a small percentage of the already limited amount of memory and controller resources within the embedded system. HTTP clients typically issue small but frequent requests and hence the server connection overhead discussed above is relatively significant when compared to application processing. An HTTP client issuing a small steady stream of HTTP requests can cause the HTTP server to exhaust its entire share of resources in the embedded system quickly. For example, with TCP TIME_WAIT timer set at 1 minute, a steady stream of one HTTP request every 20 milliseconds is held in the TIME_WAIT state as long as the stream exists. With a TCP control block size of 1 Kb per connection, that results in 3 Mb of indirect memory per minute overhead caused by the HTTP server.

Conventional Web servers typically impose a limit on the number of concurrent connections that can be served, but conventional web servers do not impose rate limiting on clients that issue frequent connection requests. The clients sending frequent connections may be legitimate, however, the client may instead be malfunctioning or sending fraudulent connection requests. Conventional Web servers frequently have lists of IP addresses called IP access lists to block requests from clients known to send fraudulent connection requests. The Web servers, however, need some way of knowing the clients likely to send fraudulent requests in order to create the IP access list. Even where a Web server has an IP access list, fraudulent requesters can use a technique called IP spoofing to bypass the IP access list. In IP spoofing, an attacker manipulates a connection request so that the request appears to originate from a trusted client. IP spoofing enables a fraudulent client to access the Web server in spite of the use the IP access list. In addition, the IP access list results in some undesirable action by the Web server because Web servers using IP access lists are typically configured to send a hard reset error to the requesting client in response to a connection request with a blocked IP address. This is generally not a problem if the IP access list is static, however, if the IP access list is dynamic, a hard error sends too permanent a message to the requesting client.

A dynamic access list is preferable to a static access list because, in many cases, the client making frequent requests is doing so only temporarily. Generally, the requesting client is running one or more applications making the requests based on need or due to a software bug. The requesting client is typically unaware of the resource constraints faced by the server. Therefore, it is preferable to maintain the possibility of communications between the client and the Web server. To accomplish this, the Web server preferably pushes back on the clients graciously, that is, without hard errors, and rate limits the acceptance of incoming connections. It is desirable to have a method and apparatus for implementing a dynamic access list able to handle not only malfunctioning and fraudulent clients but also frequent legitimate requestors.

Embodiments of the present invention significantly overcome such deficiencies and provide a method and apparatus for rate limiting and filtering of HTTP and HTTPS server connections in embedded systems. The system of the present invention includes a throttle filter which is a dynamic filter that filters web connection requests at the transport layer (e.g. the TCP step of making a Web connection). The throttle filter is a list of client identifiers for clients to be blocked based on the application layer outcome (e.g. the HTTP or HTTPS connection success or failure) of past connection requests.

The throttle filter data is updated periodically with data from a connection database. The connection database stores data from past connection requests and the associated application layer outcomes. In the connection database, a rank is associated with each client identifier to reflect the outcome of the connection requests from the particular client at the application layer. The system drops the connections from clients found in the throttle filter which results in a soft error at the clients. The system further includes a rate limiting component. The system drops connections globally when the system approaches thresholds indicating overload conditions. Under non-overload conditions, the system applies the throttle filter thereby dropping connections selectively.

More specifically, embodiments of the invention provide methods and apparatus for rate limiting and filtering Web server connections in embedded systems. One such method embodiment is implemented in a computerized device and includes the step of receiving a connection request having an application layer component and a transport layer component. The computerized device then provides a connection database to store information about connection requests and associated application layer outcomes. The computerized device further provides a throttle filter using data from the connection database where the throttle filter filters the received connection request at the transport layer component. The computerized device then applies the throttle filter to the received connection request. If the throttle filter blocks the transport layer component of the connection request, the computerized device drops the connection request. If the throttle filter allows the transport layer component of the received connection request, the computerized device proceeds with the application layer component of the received connection request. In another arrangement of the invention, the computerized device then adds data from the application layer outcome of the received connection request to the connection database and updates the throttle filter with information from the connection database. In another arrangement of the invention, the connection request is an HTTP request where the application layer component is an HTTP connection component and the transport layer component is a TCP connection component. The computerized device uses application layer feedback to control connections at the transport layer. Further, the method is dynamic in that the filter data is updated, thereby enabling the computerized device to block for a finite duration connection requests from clients that are only temporarily faulty.

In another embodiment of the invention, the step of adding data from the application layer outcome of the connection request to the connection database includes the step of recording a connection requester identifier to the connection database. The computerized device then provides a connection requestor rank to the connection requestor identifier based on an outcome of the application layer component. The database stores the data to be used as feedback by the computerized device. Each application layer connection attempt is recorded and ranked on criteria including the success or failure of the application layer connection attempt.

In another embodiment of the invention the step of updating the throttle filter with information from the connection database comprises the step of periodically replacing throttle filter data with a preselected number of connection requestor identifiers ranked least desirable in the connection database. A dynamic throttle filter enables the computerized device to respond to changing conditions at connection requesters.

In another embodiment of the invention, the throttle filter is a list of connection request characteristics and the computerized device compares data from the connection request to the list of connection request characteristics. In one arrangement, the list of connection request characteristics is a list of connection requestor IP addresses to be blocked as indicated by data from the connection database. In another arrangement, the list of connection request characteristics is a list of connection requestor port numbers in addition to IP addresses to be blocked as indicated by data from the connection database. Port numbers may be used in special cases where fixed client source port allocation is used in configurations such as network address translation (NAT) or port address translation (PAT).

In another embodiment of the invention, the step of applying the throttle filter further comprises the step of determining whether a limit of connections created in a connection cycle period has been exceeded. The computerized device then drops the connection request if the limit of connections created has been exceeded. If the limit of connections created has not been exceeded, the computerized device determines whether a rate of incoming connections has been exceeded. If the rate of incoming connections has been exceeded, the computerized device then drops the connection request. If the rate of incoming connections has not been exceeded, the computerized device compares requestor identification information in the connection request to data in the throttle filter. The computerized device detects overload conditions and proceeds to drop any incoming connection request until the overload conditions are ended.

In another embodiment of the invention, a system to filter server connections includes a network interface to receive a connection request from a requestor. The connection request has an application layer connection component and a transport layer connection component. The system further includes a filter device to filter connections using the transport layer connection component. The filter device includes a connection database and a throttle filter. The connection database stores information about connection requests and application layer component outcomes. The throttle filter has data from the connection database to filter connection requests using the transport layer connection component. The system further includes a controller coupled to the filter device and the network interface. The controller applies the throttle filter to the transport layer connection component of the connection request. The controller drops the connection request if the throttle filter blocks the transport layer component. The system proceeds with an application layer connection if the throttle filter allows the transport layer component. The controller adds data about the application layer connection to the connection database and updates the throttle filter with information from the connection database. In one arrangement, the server connection is an HTTP server connection where the application layer connection component is an HTTP connection component and the transport layer connection component is a TCP connection component. The system filters Web server connections by using application layer feedback to control connections at the transport layer. Further, the system is dynamic in that the throttle filter data is updated thereby during operation thereby enabling the system to block for an indefinite period connection requests from clients that are only temporarily faulty.

In another embodiment of the invention, the filter device includes a rate limiter to switch the filter device between global and selective modes. The rate limiter switches the filter device to global mode if a rate limit threshold is exceeded. The rate limiter switches the device to selective mode if the rate limit threshold is not exceeded. In one arrangement of the invention, the rate limit threshold is a limit of connections created in a connection cycle period. In another arrangement of the invention, the rate limit threshold is a rate of incoming connections. The controller is configured to drop the connection request without applying the throttle filter if the filter device is in global mode. The controller is further configured to apply the throttle filter if the filter device is in selective mode. The system detects overload conditions and proceeds to drop any incoming connection request until the overload conditions are ended.

In another embodiment of the invention, the connection database is a table in which each entry has an IP address of a connection requester and an associated rank based on an outcome of a connection attempted in response to a connection request from the connection requestor. In another arrangement, the connection database table further includes a port number of the connection requestor. The system stores the data to be used as feedback by the computerized device. Each application layer connection attempt is recorded and ranked on criteria including the success or failure of the application layer connection attempt. The rank is averaged over time.

In another embodiment of the invention, each entry in the connection database table includes an entry age since the last update of the entry and the system is configured to delete entries having an entry age that exceeds an age threshold. The size of the connection database is periodically reduced by deleting old, unused entries. Additionally, oldest entries are replaced to make room for new entries if the connection database is full.

In another embodiment of the invention, the throttle filter is a list of IP addresses of connection requesters to be blocked as indicated by data from the connection database. In another arrangement, the throttle filter further includes port numbers of connection requesters to be blocked as indicated by data from the connection database. The IP addresses of connection requestors identifies individual client machines except in certain configurations of network address translation (NAT). In configurations having fixed client source port allocation, port numbers identify particular sources of problem data traffic.

In another embodiment of the invention, a method is implemented in an embedded system and includes the step of receiving a connection request having an HTTP connection component and a TCP connection component. The embedded system provides a connection database to store information about connection requests and associated HTTP connection outcomes. The embedded system provides throttle filter using data from the connection database where the throttle filter is to filter the connection request at the TCP connection component. The embedded system determines whether a limit of connections created in a connection cycle period has been exceeded. The embedded system drops the connection request if the limit of connections created has been exceeded. The embedded system determines whether a rate of incoming connections has been exceeded if the limit of connections created has not been exceeded. If the rate of incoming connections has been exceeded, the embedded system then drops the connection request. If the rate of incoming connections has not been exceeded, the embedded system compares requestor identification information in the TCP connection component of the connection request to data in the throttle filter. If the throttle filter blocks the TCP connection component, the embedded system drops the connection request. If the throttle filter allows the TCP connection component, the embedded system proceeds with the HTTP connection. The embedded system then adds the data from the HTTP connection component to the connection database and updates the throttle filter with information from the connection database.

The method enables an embedded system such as a router to control Web connections using application layer feedback to filter and rate limit the Web connections at the transport layer. HTTP connection outcomes are used to rank connection requesters. The rank values are averaged over time. The embedded system uses the connection requester and rank data to make a throttle filter to filter received Web connections. The filter is dynamic thus enabling the embedded system to permit clients which have exhibited favorable patterns of use according to their rank history.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

Embodiments of the invention include a system and method implemented in an embedded computerized device, such as a router, to intelligently and dynamically rate limit and filter server connections at the transport layer based on application layer outcomes of past connection requests. For example, a router configured and operating according to principles of the present invention is able to rate limit and filter HTTP and HTTPS connections at the TCP level. A filter is updated periodically with new information from the outcomes of the HTTP and HTTPS connections. The router drops filtered connection requests silently thereby avoiding a hard error at the client enabling the device to handle requests from temporarily malfunctioning connection requestors.

Figure 1:
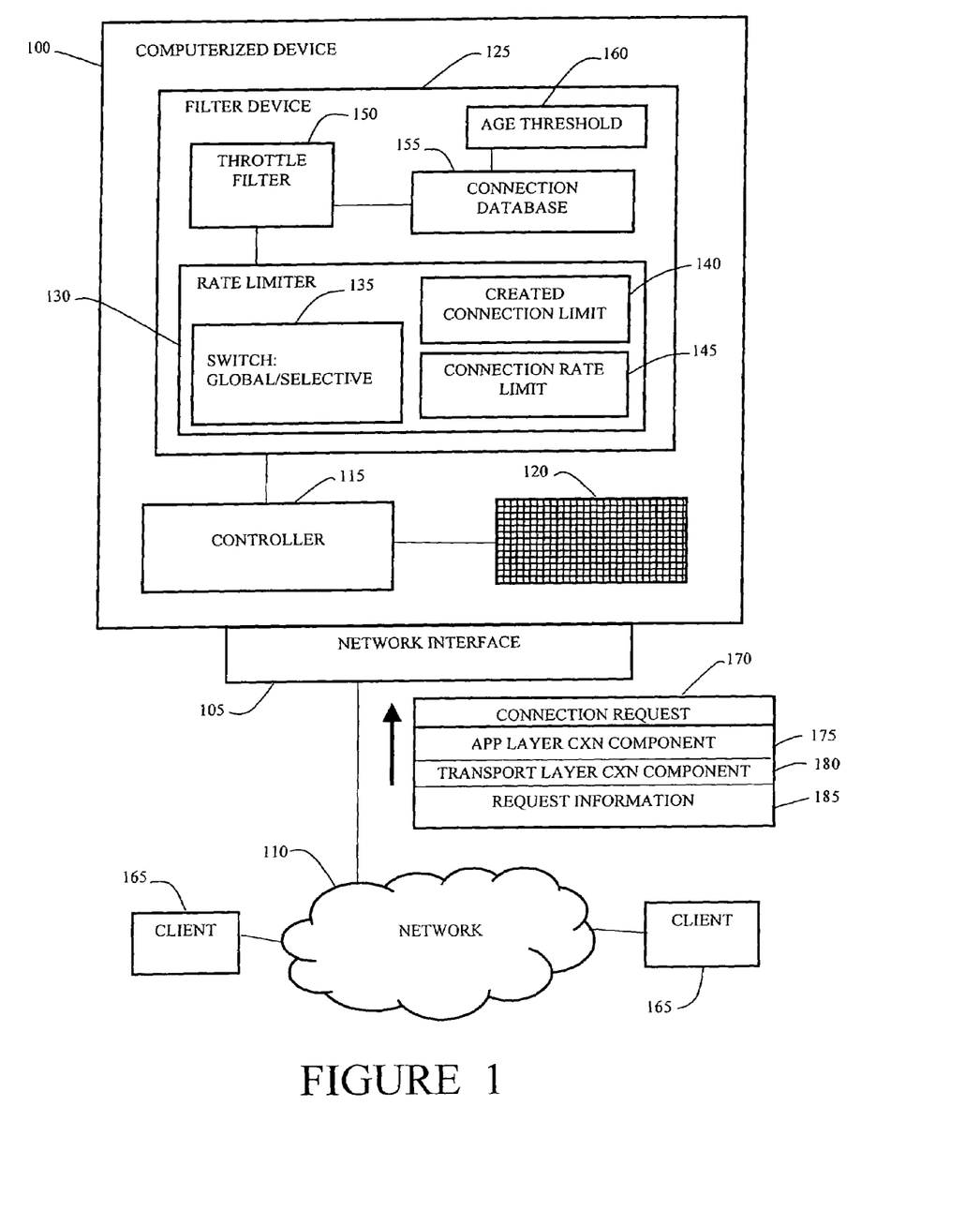
FIG. 1 is a block diagram of a computerized device having filter and rate limiter elements according to principles of the invention.

FIG. 1 is a computerized device 100 configured and operating according to principles of the invention. The computerized device 100 is connected through a network interface 105 to a network 110. The computerized device 100 is, for example, part of an embedded device such as a network router. The network 110 is, for example, the Internet. Client computer systems 165 are also connected to the network 110. The clients 165 transmit connection requests 170 having an application layer connection component 175, a transport layer connection component 180 and requestor information 185. The requester information 185 includes connection requestor identifiers such as IP address and port number.

The computerized device 100 includes a controller 115 coupled to a memory 120 and further coupled to a filter device 125. The filter device 125 has a rate limiter 130, a throttle filter 150 and a connection database 155. The rate limiter 130 limits the connections made by the computerized device 100 in response to the connection requests 170 from the clients 165.

The rate limiter 130 has a switch 135 that puts the rate limiter 130 in a global mode when the rate limiter 130 detects an overload condition or in a selective mode when the rate limiter 130 does not detect an overload condition. The rate limiter 130 uses a created connection limit 140 and a connection rate limit 145 to detect the overload condition.

The throttle filter 150 is a dynamic filter that is a list of connection request characteristics. The filter device 125 uses the throttle filter 150 to block requests from undesirable requesters based on the requestors' past requests. The connection request characteristics are typically connection requestor identifiers. A connection requestor identifier is, for example, a client IP address. In an alternative embodiment of the invention, the list of connection requester identifiers includes both client IP addresses and port numbers. The connection requestor identifier could be any information identifying the connection requestor (e.g. the client 165) derived from the requestor information 185 in the connection request 170 and is therefore, not limited to the requester identifiers listed here. The throttle filter is updated periodically with data from the connection database 155.

Figure 2:
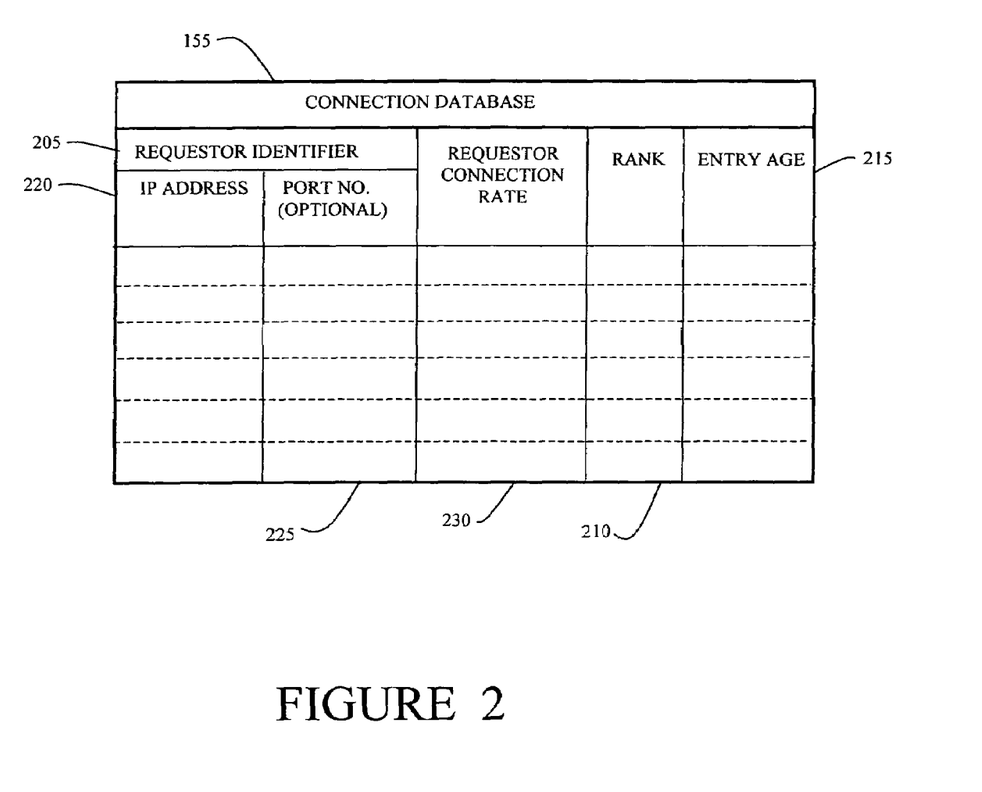
FIG. 2 is a block diagram of the connection database in the computerized device of FIG. 1.

The connection database 155 stores connection requester identifiers and associated ranks as shown in FIG. 2. Each entry in the connection database 155 also has an entry age 215 that represents time since a last update. When the computerized device 100 receives a connection request 170, the computerized device 100 adds the connection requestor identifier from the connection request 170 to the connection database 155, if the connection requestor identifier is not already there. The computerized device 100 determines the associated rank generally based on the request outcome at the HTTP level. The connection database 155 has an age threshold 160 used to age out entries from the connection database 155. Also, when the connection database 155 is full, the oldest entries with more favorable rank points are replaced with new entries.

In operation, the clients 165 transmit connection requests 170 to the computerized device 100. The connection requests 170 are upper layer OSI model connection requests each having an application layer connection component 175 and a transport layer connection component 180 as well as requestor information 185. The connection requests are, for example, HTTP or HTTPS requests. The present invention operates equivalently for either an HTTP connection request or an HTTPS connection request. For the sake of convenience, then, the acronym HTTP(S) will be used where the connection request 170 could be either an HTTP connection request or an HTTP(S) connection request. The application layer connection component 175 of the connection request 170 is the HTTP connection component. The transport layer connection component 180 of the connection request 170 typically has the TCP format and is referred to as the TCP connection component. Connections are made from the lower level layers and working up. Accordingly, the computerized device 100 responds first to the TCP connection component.

When the computerized device 100 receives the connection request 170 through the network interface 105, the controller 115 in conjunction with the memory 120 applies the rate limiter 130 to the TCP connection component 180 of the connection request 170. If the computerized device 100 is under overload conditions, the switch 135 puts the rate limiter 130 in global mode. The rate limiter 130 signals an overload condition if either the created connection limit 140 or the connection rate limit 145 are exceeded. These limits will be explained in further detail below. In global mode, the computerized device 100 filters all connection requests 170. If the computerized device 100 is not under overload conditions, the switch 135 puts the rate limiter 130 in selective mode.

When the rate limiter 130 is in selective mode, the controller 115 applies the throttle filter 150. The throttle filter 150 is, for example, a list of client identifiers which the filter device 125 uses to determine whether the connection request 170 should be filtered. The client identifiers are for example client IP addresses. If the connection request 170 was transmitted by a client 165 that the controller finds in the throttle filter 150, the computerized device 100 drops the connection request 170. When the computerized device 100 filters a connection request 170, the computerized device 100 merely drops the connection request 170 without sending an error message to the client. This is referred to as dropping the connection request 170 silently. This results in a soft error at the client 165. The soft error enables the client to retry making a connection. By silently dropping the connection, the computerized device 100 is able to maintain the possibility of connection with a device that is only temporarily malfunctioning.

Using the filter device 125, the computerized device 100 can intelligently rate limit server connections. The filter device 125 learns the usage characteristics of sources of connection requests. Those connection requestors that make frequent requests that are productive are generally enabled to continue to make server connections. Those connection requestors that make frequent requests that are not productive are generally blocked from making server connections. Additionally, the filter device 125 is integratable into existing protocols.

FIG. 2 is a block diagram of the connection database of FIG. 1. The connection database 155 stores the application layer outcomes of connection requests 170. Each entry in the connection database 155 includes at least one connection requester identifier 205 and an associated rank 210 and an entry age 215. The entry age 215 is typically the time since that entry was updated with a connection outcome. In an alternative embodiment, an entry also includes a requestor connection rate 230 associated with the requestor identifier 205. The requestor identifier 205 is typically an IP address 220 of the connection requester. In some networks such as networks having network address translation (NAT), for example, the connection requestor IP address 220 is not unique to a single client machine. In the NAT embodiment, where the NAT device uses fixed port allocation, port numbers 225 can be used to identify a client. In that case, the connection database 155 includes port numbers 225 in addition as requestor identifiers 205. Alternatively, in a virtual private network (VPN) environment, the requestor identifier 205 may be a virtual routing forwarding (VRF) table ID. In the VPN environment, a common IP address is typically used among connection requesters, however, the VRF table ID can be used to identify a particular connection requestor.

The rank 210 associated with each connection requestor identifier 205 is generally based on the application layer outcome of the connection request 170. In a first example arrangement of the invention, the computerized device 100 assigns points to each connection requestor identifier 205 each time a request having that particular identifier fails to complete a connection at the application layer. For example, each time a client 165 sends an HTTP(S) connection request that fails at the HTTP connection, the computerized device adds points to the rank associated with the client 165.

Periodically, the computerized device 100 selects a predetermined number of entries having points indicating that the connection requestor is undesirable. The computerized device 100 replaces existing data in the throttle filter 150 with these newly selected entries. In a second arrangement of the invention, the computerized device 100 assigns points each time a connection outcome is determined. In the present example embodiment, the computerized device 100 assigns a low number of points for productive connections and a high number of points for unproductive connections. For example, the filter device 125 may use the HTTP(S) response status codes to determine points to be assigned for a connection's behavior where the connection is an HTTP(S) connection. In this example, the computerized device 100 assigns zero or some low number of points when a connection generates a 1xx, 2xx or 3xx response. The computerized device 100 assigns a higher number of points when a connection generates a response timeout, an SSL handshake failure, a 4xx response, or a 5xx response (except a 503 response which is the temporary server unavailability response). In a further alternative embodiment of the invention, the computerized device 100 subtracts points for productive server connections. In a still further embodiment of the invention, the computerized device 100 assigns fewer points to connection requesters that are favorable and assigns more points to connection requestors that are not based on an administrative policy. This provides a load balancing benefit in addition to attack and overload protection. Other ways of providing a rank to a requestor identifier are possible within the scope of the present invention. The present invention is not limited to those ways of determining the rank of a requestor identifier provided here.

In one embodiment of the invention, the rank 210 is time averaged to prevent the connection database from growing too large and to keep data current. After a predetermined period, the associated rank is, for example, halved. Time averaging of the rank 210 continues for as long as the entry is in the database. If there is no activity in connection outcomes for a particular connection requester for several periods, the rank associated with that connection requestor is set to zero.

Requestor connection rate is the rate of incoming connections from a particular connection requester. Requestor connection rate can be computed using, for example, exponential averaging. Requestor connection rate is a usage characteristic that can indicate an attack but also can be used to limit connection requesters in order to load balance and avoid overload conditions by assigning rank points based on requester connection rate.

To prevent the connection database 155 from growing overly large, each entry in the connection database 155 has the entry age 215. Entry age is the time since a last update of the entry. Entry age may be implemented, for example, as a timestamp. Periodically, the computerized device 100 reviews the connection database 155 and deletes entries have an age 215 older than the age threshold 160. This is mere one example way of aging out entries from the connection database 155. Other ways of aging out database entries are possible within the scope of the present invention.

Figure 3:
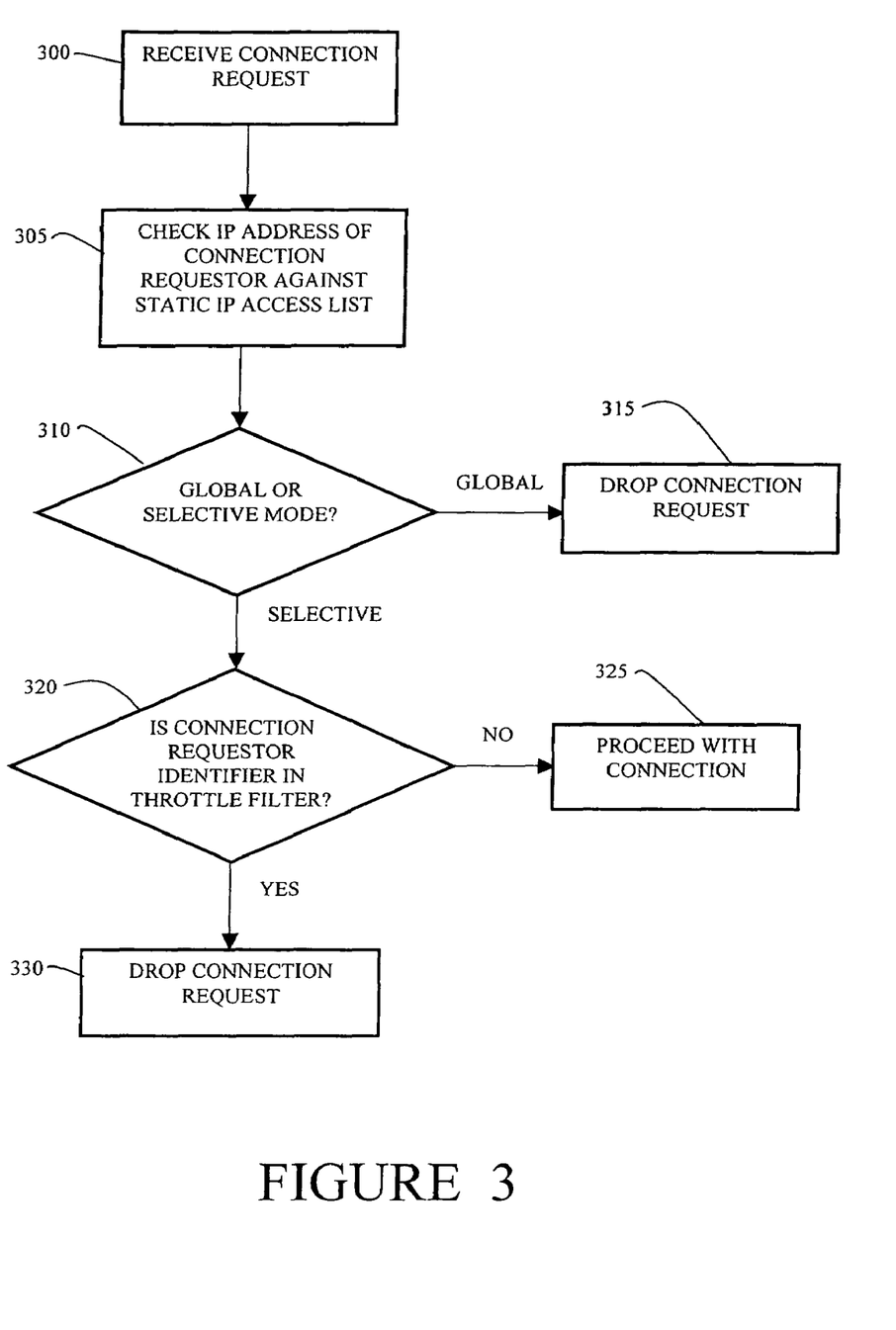
FIG. 3 is a flow chart of the process of filtering and rate limiting Web server connection according to principles of the invention.

FIG. 3 is a flow chart of the process of filtering and rate limiting Web server connection according to principles of the invention.

At step 300, the computerized device 100 receives a connection request 170 from a client 165. The clients 165 transmit connection requests 170 having an application layer connection component 175, a transport layer connection component 180 and requester information 185. The requestor information 185 includes connection requestor identifiers such as IP address and port number. For example, if the connection request is an HTTP(S) request, the application layer connection component 175 is an HTTP connection component and the transport layer connection component 180 is a TCP connection component. The requester information 185, as described above, includes connection requestor identifiers such as IP address of the client 165 or the source port number.

At step 305, the computerized device 100 optionally checks the IP address of the connection requester against a static IP access list. If the computerized device 100 finds the IP address of the connection requestor in the static IP access list, the computerized device 100 blocks the connection request. The static IP access list is part of conventional art devices and is used to block server connections from connection requestors known to be illegitimate. The present invention by itself is successful at blocking requests from illegitimate requestors, however, the static IP access list provides a first line of defense that increases the efficiency of the present invention.

At step 310, the computerized device 310 determines whether the rate limiter 130 is in global or selective mode. When the computerized device 100 is in an overload condition, the rate limiter 130 switches to global mode in which all connection requests are dropped. When the computerized device 100 is not in an overload condition, the rate limiter 130 switches to selective mode in which the filter device 125 applies the throttle filter 150. The process of the rate limiter 130 switching from global mode to selective mode and vice versa is described below in relation with FIG. 4.

At step 315, the rate limiter 130 is in global mode and the computerized device drops the connection request 170. In global mode, the filter device 125 blocks any incoming connection because the rate limiter 130 has detected an overload condition as described below with regard to FIG. 4.

At step 320, the rate limiter 130 is in selective mode and the computerized device 100 applies the throttle filter 150 at the transport layer connection component of the connection request 170. The computerized device 100 searches for a match of an IP address in the requestor information 185 in the connection request 170 and an entry in the throttle filter 150. Alternatively, if, for example, the network 110 uses NAT, the computerized device 100 searches for a match of an IP address and a port number in the requestor information 185 and an entry in the throttle filter.

At step 325, the computerized device 100 has not found the connection requestor identifier (IP address or port number) in the throttle filter 150 and proceeds with the connection. Proceeding with the connection involves first establishing the transport layer connection, in this example the TCP connection. If the connection request 170 is an HTTPS request, the computerized device 100 next establishes the SSL connection. As will be described above, if the SSL connection fails, the computerized device 100 assigns points to the connection requestor which are saved to the connection database 155. If there is no SSL portion or if the SSL connection is successful, the computerized device proceeds with the application layer component, in this example, the HTTP connection. The process of creating and maintaining the throttle filter with application layer connection outcomes is described below in relation to FIG. 5.

At step 330, the computerized device 100 has found the connection requester identifier in the throttle filter and drops the connection request. Dropping the connection results in a soft error at the connection requester.

Figure 4:
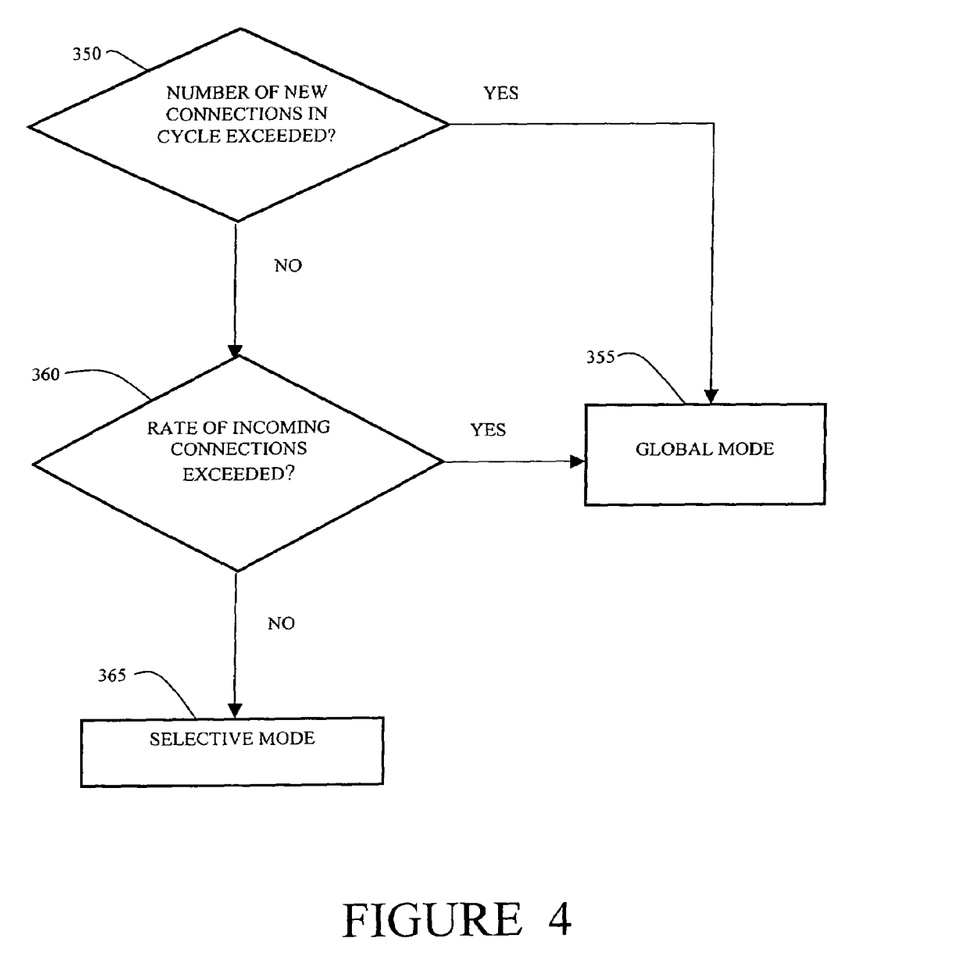
FIG. 4 is a flow chart of the process of the rate limiter of FIG. 1 switching to global or selective mode in response to a connection request.

FIG. 4 is a flow chart of the process of the rate limiter 130 switching to global or selective mode in responding to a connection request 170.

At step 350, the rate limiter 130 determines whether the number of created connections in a cycle has been exceeded. As described above with regard to FIG. 1, the rate limiter 130 has a created connection limit threshold 140. The created connection limit threshold, N, limits the number of connections created within a predetermined period, or cycle. N is set by the system administrator based on system capabilities and configuration. An example value for N is 120 connections maximum in any one cycle. If the threshold N has been reached in the cycle, the rate limiter 130 determines that the computerized device 100 is in an overload condition and proceeds to step 355. If the threshold N has not been reached in a cycle, the rate limiter 130 proceeds to step 360.

At step 355, the rate limiter 130 has determined that the computerized device 100 is in an overload condition and switches to global mode. In global mode, the computerized device 100 drops any received connection request 170 until the end of the current cycle at which point step 350 is restarted.

At step 360, the rate limiter 130 determines whether the rate of connection requests to the computerized device 100 has been exceeded. Even where N has not been exceeded, there may be a burst of connection requests 170. The rate limiter 130 has a second threshold, the connection rate limit 145, R, to handle the burst of connection requests 170. The value of R is set by the system administrator based on system capabilities and configuration. An example value of R is 60 connection requests per cycle. If R is exceeded, the rate limiter 130 determines that the computerized device 100 has an overload condition and proceeds to step 355. If R has not been exceeded, the rate limiter 130 determines that the computerized device 100 does not have an overload condition and proceeds to step 365.

At step 365, the rate limiter 130 has determined that the computerized device 100 is not in an overload condition and switches to selective mode. In the selective mode, the computerized device 100 applies the throttle filter 150 as described above with regard to FIG. 3.

The rate limiter 130 provides flexibility to the system administrators in setting limits for the computerized device 100. In addition, the selective/global switching capability enables the computerized device 100 to respond quickly to overload situations while servicing the existing connections and to return quickly to selective filtering when the overload condition is removed.

Figure 5:
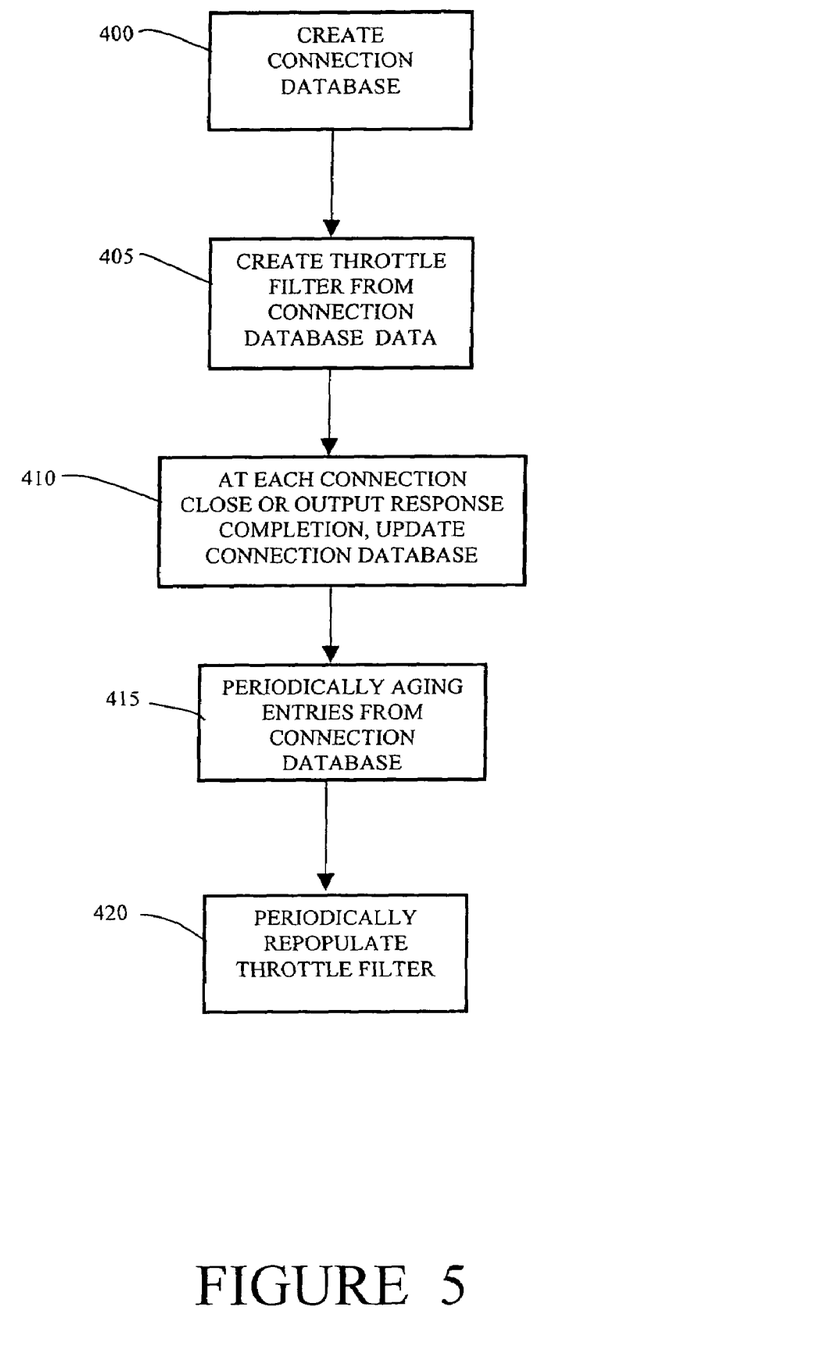
FIG. 5 is a flow chart of the creation and maintenance of the throttle filter of FIG. 1.

FIG. 5 is a flow chart of the creation and maintenance of the throttle filter 150.

First, at step 400, the filter device 125 creates a connection database 155. The connection database 155 stores the application layer outcomes of connection requests 170. As shown in FIG. 2, each entry in the connection database 155 includes at least one connection requestor identifier 205 and an associated rank 210 and an entry age 215. In an alternative embodiment, an entry also includes a requestor connection rate 230 associated with the requester identifier 205. The requester identifier 205 is typically an IP address 220 of the connection requestor or in addition, a port number. At initialization of the computerized device 100, the connection database 155 is an empty data structure. As the computerized device 100 receives connection requests 170 and proceeds with connection creation and destruction, the computerized device 100 gathers application layer outcome data which the computerized device 100 stores in the connection database 155 as described above with regard to FIG. 2.

At step 405, the filter device 125 creates the throttle filter 150. The throttle filter 150 is a dynamic filter that is a list of connection request characteristics of connection requestors to be blocked from establishing connections at the computerized device 100. The connection request characteristics are typically connection requestor identifiers such as IP addresses, port numbers, etc. The throttle filter is updated periodically with data from the connection database 155 as will be described below.

At step 410, the filter device 125 updates the connection database 155 at each connection close or output response completion. The rank 210 associated with each connection requester identifier 205 in the connection database 155 is generally based on the application layer outcome of the connection request 170. The filter device 125 determines the rank associated with each connection requester identifier 205 as described above with regard to FIG. 2.

At step 415, the filter device 125 periodically ages entries from the connection database 155. The connection database 155 has an age threshold 160 used to age out entries from the connection database 155 as described above with regard to FIG. 2. The aging process enables older, unused entries in the connection database to be deleted.

At step 420, the filter device 125 periodically repopulates the throttle filter 150. First, the filter device 125 clears the throttle filter 150 of the current data. Then the filter device takes a predetermined number of entries in the connection database 155 and copies the request identifiers 205 from those entries into the throttle filter 150. The predetermined number, P, typically the size of the throttle filter, for example has a value of 20 entries per cycle (or period). The twenty entries are, for example, the 20 entries having the highest number of assigned rank points that exceed a rank threshold. Where fewer than P entries exceed the rank threshold, only those entries exceeding the rank threshold are entered into the throttle filter 150.

By updated the connection database 155 with application layer outcomes, the filter device 125 learns the connection usage of the connection requestors and is able to determine which connection requestors to block. By cyclically repopulating the throttle filter 150 with entries from the connection database 155, the filter device 125 is able to respond quickly to changing conditions in the computerized device 100.

Figure 6:
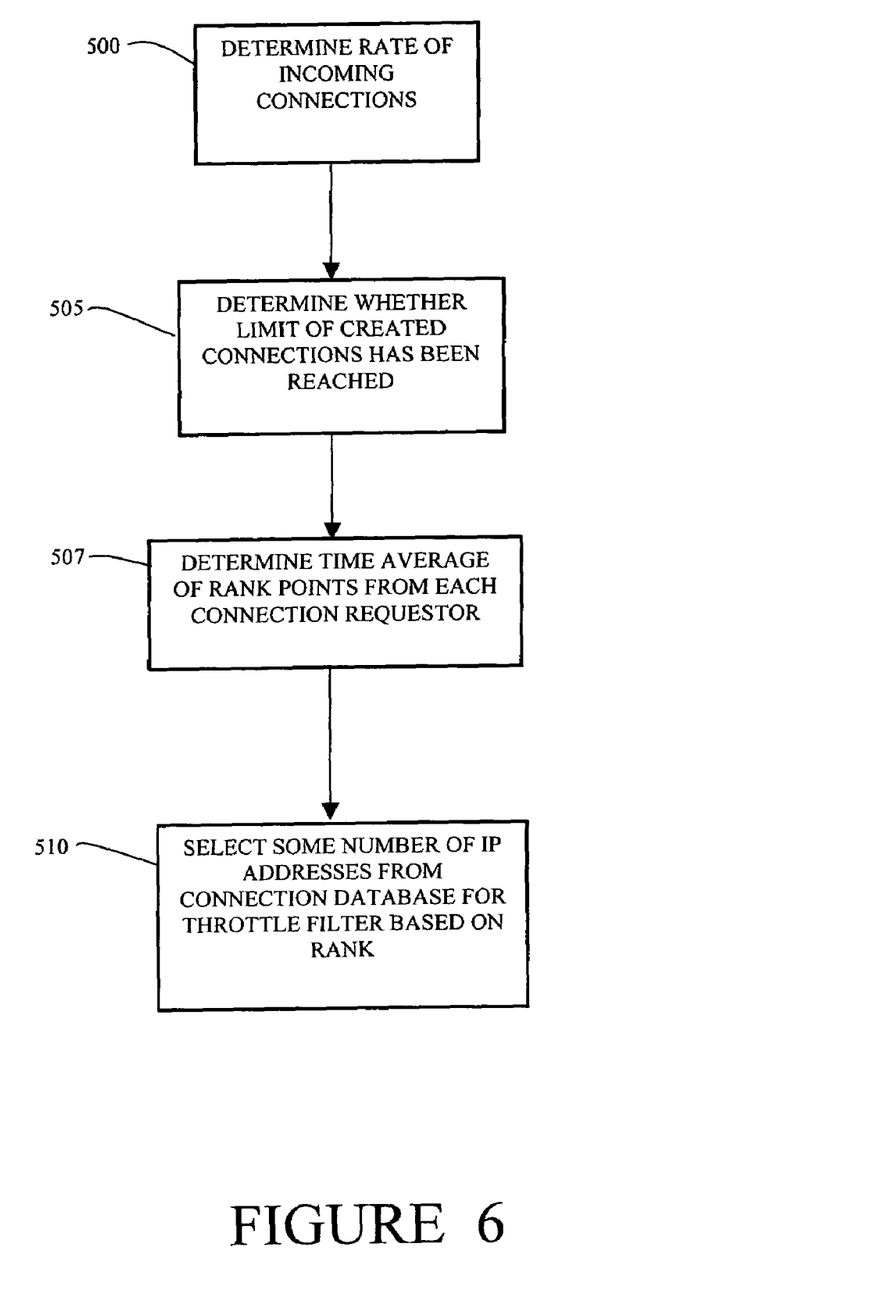
FIG. 6 is flow chart of the cyclical processes in the computerized device of FIG. 1.

FIG. 6 is a flow chart of the cyclical processes in the computerized device 100. Some of the processes described above are performed by the computerized device 100 or one of the elements inside the computerized device periodically. For optimal efficiency, a cycle T is established for connection updates. The following steps are performed during each cycle.

At step 500, the filter device 125 determines a rate of incoming connections R that is one factor in switching the filter device 125 between global and selective modes as described above with regard to FIG. 4.

At step 505, the filter device 125 determines whether the limit of created connections, N, has been reached. This is a second factor in switching the filter device 125 between global and selective modes as described above with regard to FIG. 4.

At step 507, the filter device 125 updates the time average of rank points of each connection requester within the database 155.

At step 510, the filter device 125 selects a number P of connection requestor identifiers 205 whose rank values exceed the rank threshold from the connection database 155 with which to repopulate the filter device 125.

In alternative embodiments of the invention, such as configurations with firewalls or where the computerized device is used in a gateway, etc., the computerized device 100 may be an intermediary device that merely passes through the HTTP requests and responses. Such a device enabled with the present invention could gather data from HTTP connection requests and return responses. The computerized device 100 could be similarly enabled in a network proxy device. Alternatively, the present invention could be enabled in the computerized device 100 to provide greater load balancing capabilities than those described above. In a load balancing implementation, the computerized device 100 examines Universal Resource Locators (URLs) and directs connection requests to appropriate target servers based on information first stored in the connection database and then entered into the target filter.

The present invention as described above is able to throttle client requests either selectively or globally in order to achieve a manageable incoming connection rate thus constraining the resource consumption within the computerized device. This enables the computerized device to mitigate denial of service attacks on HTTP(S) servers and typically results in faster service response times for HTTP(S) clients. The present invention also increases efficiency of other system services by the HTTP(S) servers because the HTTP(S) servers are better able to control resource consumption. In addition, various policy rating factors such as productiveness, greediness, and application preference, can be used to achieve objectives such as load balancing and differentiated services. In addition, the present invention can be implemented in conjunction with an existing static IP access list thus providing more robust resource control and protection.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a method for rate limiting and filtering HTTP(S) server connections that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a rate limiter and filter for HTTP(S) server connections that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/ or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for filtering transport layer connections with application layer information, comprising the steps of:
   receiving a connection request having an application layer component and a transport layer component;
   providing a connection database to store information about connection requests and associated application layer outcomes, the information about connection requests comprising:
      a maximum number of connections allowed in a cycle; and
      a maximum number of connection requests per requestor during a cycle;
   providing a throttle filter using data from the connection database, the throttle filter to filter the connection request at the transport layer component;
   applying the throttle filter to the received connection request;
   if the throttle filter blocks the transport layer component of the connection request, dropping the connection request silently, wherein dropping the connection silently creates a soft error in a client from an unacknowledged connection request; and
   if the throttle filter allows the transport layer component of the connection request, proceeding with the application layer component.

2. The method of claim 1 further comprising the steps of:
   adding data from an application layer outcome of the connection request to the connection database; and
   updating the throttle filter with information from the connection database.

3. The method of claim 2 wherein the step of adding data comprises the steps of:
   recording a connection requester identifier to the connection database; and
   providing a connection requester rank to the connection requester identifier based on an outcome of the application layer connection component.

4. The method of claim 2 wherein the step of updating the throttle filter with information from the connection database comprises periodically replacing throttle filter data with a preselected number of connection requester identifiers ranked least desirable in the connection database.

5. The method of claim 1 wherein the throttle filter is a list of connection request characteristics and the step of applying the throttle filter further comprises comparing data from the connection request to the list of connection request characteristics.

6. The method of claim 5 wherein the list of connection request characteristics as indicated by data from the connection database further comprises at least one of:
   a list of connection requestor IP addresses to be blocked;
   a list of connection requestor port numbers to be blocked; and
   a list of connection requestor virtual routing forwarding table IDs to be blocked.

7. The method of claim 1 wherein the step of applying the throttle filter further comprises the steps of:
   determining whether a limit of connections created in a connection cycle period has been exceeded;
   if the limit of connections created has been exceeded, dropping the connection request;
   if the limit of connections created has not been exceeded, determining whether a rate of incoming connections has been exceeded;
   if the rate of incoming connections has been exceeded, then dropping the connection request; and
   if the rate of incoming connections has not been exceeded, then comparing requestor identification information in the connection request to data in the throttle filter.

8. The method of claim 1 wherein the connection request is an HTTP request, the application layer component is an HTTP connection component and the transport layer component is TCP connection component.

9. The method of claim 1 wherein the connection request is an HTTPS request, the application layer component is an HTTPS connection component and the transport layer component is TCP connection component.

10. A system to filter server connections in an embedded system, comprising:
    a network interface to receive a connection request from a requestor, the connection request having an application layer connection component and a transport layer connection component;
    a filter device to filter connections using the transport layer connection component, the filter device including a connection database and a throttle filter, the connection database to store information about connection requests and application layer connection component outcomes, the throttle filter having data from the connection database to filter connection requests using the transport layer connection component, the stored information about connection requests comprises:
       a maximum number of connections allowed in a cycle; and
       a maximum number of connection requests per requester during a cycle; and
    a controller coupled to the filter device and the network interface, the controller to apply the throttle filter to the transport layer connection component of the connection request, to drop the connection request silently if the throttle filter blocks the transport layer component, to proceed with an application layer connection if the throttle filter allows the transport layer component, to add data about the application layer connection to the connection database, and to update the throttle filter with information about the connection database, wherein dropping the connection silently creates a soft error in the requestor from an unacknowledged connection request.

11. The system of claim 10 wherein the server connection is an HTTP server connection, the application layer connection component is an HTTP connection component, and the transport layer connection component is a TCP connection component.

12. The system of claim 10 wherein the server connection is an HTTPS server connection, the application layer connection component is an HTTPS connection component, and the transport layer connection component is a TCP connection component.

13. The system of claim 10 wherein the filter device further comprises a rate limiter to switch the filter device between global and selective modes, the rate limiter to switch the filter device to global mode if a rate limit threshold is exceeded and to switch the filter device to selective mode if the rate limit threshold is not exceeded; and the controller configured to drop the connection request silently without applying the throttle filter if the filter device is in global mode and to apply the throttle filter if the filter device is in selective mode.

14. The system of claim 13 wherein the rate limit threshold further comprises a limit of connections created in a connection cycle period.

15. The system of claim 13 wherein the rate limit threshold further comprises a rate of incoming connections.

16. The system of claim 10 wherein the connection database is a table in which each entry has an IP address of a connection requestor and an associated rank based on an outcome of a connection attempted in response to a connection request from the connection requester.

17. The system of claim 16 wherein each entry of the table further includes a port number of the connection requester.

18. The system of claim 16 wherein each entry of the table further includes a virtual routing forwarding table ID of the connection requester.

19. The system of claim 10 wherein each entry in the table includes an entry age, the filter device configured to delete entries having an entry age that exceeds an age threshold.

20. The system of claim 10 wherein the throttle filter as indicated by data from the database comprise at least one of:
a list of IP addresses of connection requestors to be blocked;
port numbers of connection requestors to be blocked; and
a virtual routing forwarding table IDs of connection requestors to be blocked.

21. A method for filtering HTTP server connections in an embedded system, comprising the steps of:
receiving a connection request having an HTTP connection component and a TCP connection component;
providing a connection database to store information about connection requests and associated HTTP connection outcomes, the information about connection requests comprises:
a maximum number of connections allowed in a cycle; and
a maximum number of connection requests per requestor during a cycle;
providing a throttle filter using data from the connection database, the throttle filter to filter the connection request at the TCP connection component;
determining whether a limit of connections created in a connection cycle period has been exceeded;
if the limit of connections created has been exceeded, dropping the connection request silently;
if the limit of connections created has not been exceeded, determining whether a rate of incoming connections has been exceeded;
if the rate of incoming connections has been exceeded, then dropping the connection request silently;
if the rate of incoming connections has not been exceeded, then comparing requester identification information in the TCP connection component of the connection request to data in the throttle filter;
if the throttle filter blocks the TCP connection component, dropping the connection request silently;
if the throttle filter allows the TCP connection component, proceeding with the HTTP connection component;
adding data from the HTTP connection component to the connection database; and
updating the throttle filter with information from the connection database, wherein dropping the connection silently creates a soft error in a requester from an unacknowledged connection request.

22. A method for filtering HTTPS server connections in an embedded system, comprising the steps of:
receiving a connection request having an HTTPS connection component and a TCP connection component;
providing a connection database to store information about connection requests and associated HTTPS connection outcomes, the information about connection requests comprises:
a maximum number of connections allowed in a cycle; and
a maximum number of connection requests per requestor during a cycle;
providing a throttle filter using data from the connection database, the throttle filter to filter the connection request at the TCP connection component;
determining whether a limit of connections created in a connection cycle period has been exceeded;
if the limit of connections created has been exceeded, dropping the connection request silently;
if the limit of connections created has not been exceeded, determining whether a rate of incoming connections has been exceeded;
if the rate of incoming connections has been exceeded, then dropping the connection request silently;
if the rate of incoming connections has not been exceeded, then comparing requester identification information in the TCP connection component of the connection request to data in the throttle filter;
if the throttle filter blocks the TCP connection component, dropping the connection request silently;
if the throttle filter allows the TCP connection component, proceeding with the HTTPS connection component;
adding data from the HTTPS connection component to the connection database; and
updating the throttle filter with information from the connection database, wherein dropping the connection silently creates a soft error in a requester from an unacknowledged connection request.

23. A computer program product having a computer-readable medium including computer program logic encoded thereon that, when performed on a computer system directs the computer system to perform the method of:
receiving a connection request having an application layer component and a transport layer component;
providing a connection database to store information about connection requests and associated application layer outcomes, the information about connection requests comprises:
a maximum number of connections allowed in a cycle; and
a maximum number of connection requests per requestor during a cycle;

providing a throttle filter using data from the connection database, the throttle filter to filter the connection request at the transport layer component;

applying the throttle filter to the received connection request;

if the throttle filter blocks the transport layer component of the connection request, dropping the connection request silently, wherein dropping the connection silently creates a soft error in a requester from an unacknowledged connection request; and if the throttle filter allows the transport layer component of the connection request, proceeding with the application layer component.

24. The method of claim 1 wherein the throttle filter is a list of client identifiers for clients to be blocked based on the application layer outcome of past connection requests and applying the throttle filter further comprises comparing data from the connection request to the list of client identifiers.

25. The system of claim 10 wherein the throttle filter is a list of client identifiers for clients to be blocked based on the application layer outcome of past connection requests and wherein the controller applies the throttle filter by comparing data from the connection request to the list of client identifiers.

26. The method of claim 1 wherein providing a connection database comprises:

providing a connection database to store information about connection requests and associated application layer outcomes, the information about connection requests comprising:

a maximum number of connections allowed in a cycle; and a maximum number of connection requests per requestor during a cycle;

wherein a cycle is a predetermined period of time, determined based upon capabilities and configuration of a system to which the connection database belongs.

* * * * *